(12) United States Patent
Duan et al.

(10) Patent No.: US 11,446,885 B2
(45) Date of Patent: Sep. 20, 2022

(54) FRICTION-REDUCING AND ANTI-WEAR COMPOSITE MATERIAL FOR WADING KINEMATIC PAIR AND PREPARATION METHOD THEREFOR

(71) Applicant: Wuhan Research Institute Of Materials Protection, Hubei (CN)

(72) Inventors: Haitao Duan, Hubei (CN); Tian Yang, Hubei (CN); Jian Li, Hubei (CN); Meng Yi, Hubei (CN); Jiesong Tu, Hubei (CN); Dan Jia, Hubei (CN); Shengpeng Zhan, Hubei (CN); Yongliang Jin, Hubei (CN); Jianwei Qi, Hubei (CN)

(73) Assignee: Wuhan Research Institute Of Materials Protection, Wuhan (CN)

( * ) Notice: Subject to any disclaimer, the term of this patent is extended or adjusted under 35 U.S.C. 154(b) by 271 days.

(21) Appl. No.: 16/804,158

(22) Filed: Feb. 28, 2020

(65) Prior Publication Data

US 2020/0276773 A1 Sep. 3, 2020

(30) Foreign Application Priority Data

Feb. 28, 2019 (CN) .......................... 201910152299.5

(51) Int. Cl.
*B29C 70/52* (2006.01)
*B29C 70/10* (2006.01)
(Continued)

(52) U.S. Cl.
CPC .......... *B29C 70/525* (2013.01); *B29C 43/006* (2013.01); *B29C 70/10* (2013.01);
(Continued)

(58) Field of Classification Search
CPC .......... B29K 2079/08; B29K 2079/085; B29K 2071/00; B29K 2105/251; B29K 2279/08;
(Continued)

(56) References Cited

U.S. PATENT DOCUMENTS

2002/0028151 A1    3/2002  Manner et al.
2007/0134535 A1*   6/2007  Song ..................... B29C 43/021
                                                              252/511

(Continued)

FOREIGN PATENT DOCUMENTS

CN    106398111 A    2/2017
CN    107283871 A   10/2017

*Primary Examiner* — Jeffrey M Wollschlager

(57) ABSTRACT

Disclosed is a friction-reducing and anti-wear composite material for a wading kinematic pair and a method of preparing the same. The friction-reducing and anti-wear composite material is prepared from carbon fiber (CF) among inorganic fillers, polyimide (PI) and polyether ether ketone (PEEK). These three materials are wet-mixed, dried and placed in a mold followed by curing by a heat press. The cured product is cooled and demolded to obtain the CF/PI/PEEK friction-reducing and anti-wear composite material for a wading kinematic pair. Tribological properties of the PEEK material are enhanced due to synergistic effect arising from hybrid organic-inorganic filling. The friction-reducing and anti-wear composite material provided in the invention has significantly reduced friction coefficient and wear volume loss under the seawater environment.

3 Claims, 3 Drawing Sheets

(51) Int. Cl.
  *B29C 43/00*    (2006.01)
  *B63B 35/44*    (2006.01)
  *B29K 71/00*    (2006.01)
  *B29K 105/00*   (2006.01)
  *B29K 307/04*   (2006.01)
  *B29K 279/00*   (2006.01)

(52) U.S. Cl.
  CPC ...... *B63B 35/4413* (2013.01); *B29K 2071/00* (2013.01); *B29K 2105/251* (2013.01); *B29K 2279/08* (2013.01); *B29K 2307/04* (2013.01); *B29K 2995/0073* (2013.01); *B29K 2995/0087* (2013.01); *B29K 2995/0089* (2013.01); *B63B 2231/40* (2013.01)

(58) Field of Classification Search
  CPC ........ B29K 2307/04; B29K 2995/0073; B29K 2995/0087; B29K 2995/0089; B29K 2105/12; B29C 43/006; B29C 43/003; B29C 70/525; B29C 70/10; B29C 43/58; B29C 2043/5816; B63B 35/4413; B63B 2231/40
  See application file for complete search history.

(56) References Cited

U.S. PATENT DOCUMENTS

| | | | |
|---|---|---|---|
| 2008/0211131 A1* | 9/2008 | Leinweber | B29C 43/18 264/112 |
| 2018/0273707 A1* | 9/2018 | Price | B29C 43/003 |
| 2018/0358630 A1* | 12/2018 | Woo | H01M 8/0226 |
| 2020/0055234 A1* | 2/2020 | Watanabe | C08L 27/12 |

* cited by examiner

FRICTION-REDUCING AND ANTI-WEAR COMPOSITE MATERIAL FOR WADING KINEMATIC PAIR AND PREPARATION METHOD THEREFOR

CROSS-REFERENCE TO RELATED APPLICATIONS

This application claims the benefit of priority from Chinese Patent Application No. 201910152299.5, filed on Feb. 28, 2019. The content of the aforementioned application, including any intervening amendments thereto, is incorporated herein by reference in its entirety.

TECHNICAL FIELD

The present application relates to polymer materials for wading units of marine equipment, and more particularly to a friction-reducing and anti-wear composite material for a wading kinematic pair and a method of preparing the same.

BACKGROUND OF THE INVENTION

Progress in science and technology accelerates our pace to explore the ocean. Major projects such as submarines, submarine tunnels, sea-crossing bridges and ocean petroleum platforms have been continuously constructed. High-performance polymers used in the ocean play an essential role in the development, application and reliable operation of marine engineering equipment, and strongly support the development of marine resource mining equipment and offshore detection platform. According to previous research, a single-polymer material used in the ocean has poor load-bearing performance under heavy load. Even PEEK materials and CF modified PEEK composite materials which have excellent properties have weakened tribological performance under heavy load, hardly meeting the polymeric material requirement of the kinematic pair of marine engineering equipment which operates at high speed and under heavy load for a long time. Single polyimide PI-3 (P84) has a strong load-bearing capacity, displaying excellent abrasion resistance under heavy load; CF is a filler that can significantly increase self-lubricating properties of polymeric materials under seawater. However, the prior art did not disclose any material compounding PI, CF and PEEK materials for friction reduction and abrasion resistance purpose.

SUMMARY OF THE INVENTION

Given the above, this invention aims to provide a friction-reducing and anti-wear composite material for a wading kinematic pair and a method of preparing the same, which substantially enhances the friction reduction and abrasion resistance of composite materials due to synergistic effect arising from hybrid organic-inorganic filling.

The technical solutions of the invention are described as follows.

A friction-reducing and anti-wear composite material, comprising:

a PEEK material as a matrix material;

a high-strength chopped fiber as a reinforcing material; and a PI material for increasing abrasion resistance;

wherein the PEEK material, the high-strength chopped fiber and the PI material are mixed followed by hot pressing to prepare the friction-reducing and anti-wear composite material.

In some embodiments, the high-strength chopped fiber is an inorganic filler CF; and the PEEK material, the high-strength chopped fiber and the PI material are wet-mixed in a volatile solvent.

In some embodiments, based on 70 parts by weight of the PEEK material, the inorganic filler CF is 3-20 parts by weight, and the PI material is 10-27 parts by weight.

In some embodiments, based on 70 parts by weight of the PEEK material, the inorganic filler CF is 5-10 parts by weight, and the PI material is 20-25 parts by weight.

In some embodiments, the PEEK material and the PI material are in the form of powder, and the inorganic filler CF is ground chopped fiber.

The CF/PI/PEEK composite material is prepared from the inorganic filler carbon fiber (CF), polyimide (PI) and polyether ether ketone (PEEK) at a certain ratio. These materials are preferably wet-mixed in a volatile solvent for good interfacial compatibility between the filler and the matrix material and avoid static electricity generated during dry-mixing. Particularly, PI powder, chopped CF powder and PEEK powder are placed in a beaker to which the volatile solvent is added to immerse the powder, and then mechanically stirred for 0.5 h to obtain a viscous mixture. Then the viscous mixture is dried at 140-160° C. for 3 h to obtain a powder mixture. Subsequently, the powder mixture is placed in a mold and pre-pressed under 20-30 MPa 3 times, for 3-5 min each time. The next is the curing and forming process. Specifically, the mold is preheated to 145-155° C. at a rate of 90-110° C./h; a pressure of 30-40 MPa is applied on the mold; and the temperature is kept at 145-155° C. for 1-2 h. The temperature of the mold is raised to 255-265° C. at a rate of 40-60° C./h; the pressure applied on the mold is increased to 60-80 MPa; and the temperature is kept at 255-265° C. for 1 h. The temperature of the mold is raised to 370-380° C. at a rate of 40-60° C./h, and when a temperature controller indicates that the temperature reaches the desired temperature, the pressure applied on the mold is increased to 100-120 MPa; and the temperature at 370-380° C. and the pressure at 100-120 MPa are kept for 3-4 h, during which gas is discharged 2-3 times. After curing, the temperature of the mold is lowered to 255-265° C. at a rate of 40-60° C./h; the pressure of the mold is reduced to 60-80 MPa; and the temperature is kept at 255-265° C. for 1-2 h. The mold is naturally cooled at a rate of 90-110° C./h; and the pressure of the mold is released followed by demolding.

Compared with the prior art, the invention has the following beneficial effects.

(1) In the invention, polyether ether ketone (PEEK) powder is used as the matrix material, and an organic polyimide (PI) and inorganic chopped carbon fiber CF are added to the PEEK powder followed by hot pressing to obtain the friction-reducing and anti-wear composite material (i.e., the CF/PI/PEEK polymeric composite) for the wading kinematic pair. The organic PI material, the inorganic chopped filler CF and the PEEK material are mixed together to take full advantage of the synergistic effect, and when the mixture of these three materials includes 10% by weight of the filler CF and 20% by weight of the PI material, the mixture has the highest synergistic effect, the lowest friction coefficient and wear loss under the seawater environment, greatly improving the friction-reducing and anti-wear properties of composite materials and broadening the range of material choices for the wading kinematic pair.

(2) In comparison with CF/PEEK composite materials and single PI material, the friction-reducing and anti-wear CF/PI/PEEK composite material provided herein has highest surface hardness, lowest water absorption rate and smallest wear volume loss after immersion in seawater, indicating that CF/PI/PEEK friction-reducing and anti-wear composite material has better resistance to plasticization and wear under the seawater environment.

DETAILED DESCRIPTION OF EMBODIMENTS

Figure 1:
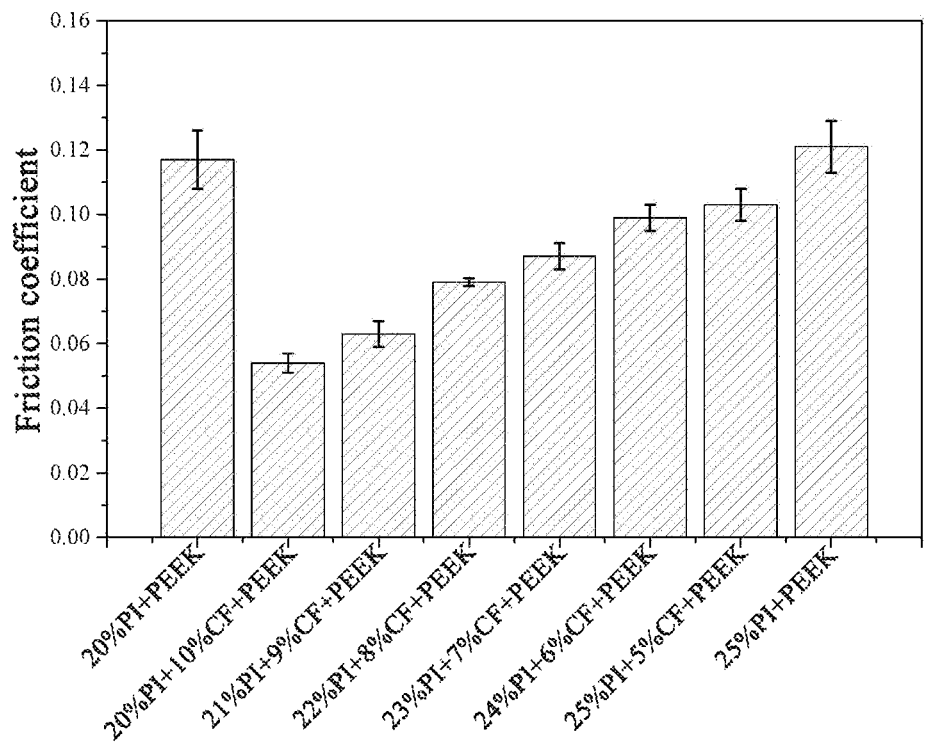
FIG. 1 is a bar graph showing the friction coefficient of various materials prepared in Examples 1-6 and Comparative Examples 1 and 2 under a seawater environment.

This invention will be described in detail below with reference to the accompanying drawings and embodiments to further illustrate the technical approaches and effects of the invention. The following embodiments are only for clearer illustration, and not intended to limit the scope of the invention.

Example 1

20% by weight of PI powder, 10% by weight of CF powder and 70% by weight of PEEK powder were placed in a beaker. Absolute ethanol was added to the breaker to immerse the powder. The resulting mixture was mechanically stirred for 0.5 h to obtain a viscous mixture. Then the viscous mixture was dried at 140-160° C. for 3 h to obtain a powder mixture. Subsequently, the powder mixture was placed in a mold and pre-pressed under 20-30 MPa 3 times, for 3-5 min each time. The following was the curing and forming process. Specifically, the mold was preheated to 145-155° C. at a rate of 90-110° C./h; a pressure of 30-40 MPa was applied on the mold; and the temperature was kept at 145-155° C. for 1-2 h. The temperature of the mold was raised to 255-265° C. at a rate of 40-60° C./h; the pressure applied on the mold was increased to 60-80 MPa; and the temperature was kept at 255-265° C. for 1 h. The temperature of the mold was raised to 370-380° C. at a rate of 40-60° C./h, and when a temperature controller indicated that the temperature reached the desired temperature, the pressure applied on the mold was increased to 100-120 MPa; and the temperature at 370-380° C. and the pressure at 100-120 MPa were kept for 3-4 h, during which gas was discharged 2-3 times. After curing, the temperature of the mold was lowered to 255-265° C. at a rate of 40-60° C./h; the pressure of the mold was reduced to 60-80 MPa; and the temperature was kept at 255-265° C. for 1-2 h. The mold was naturally cooled at a rate of 90-110° C./h; and the pressure of the mold was released followed by demolding.

Example 2

21% by weight of PI powder, 9% by weight of CF powder and 70% by weight of PEEK powder were placed in a beaker. Absolute ethanol was added to the breaker to immerse the powder. The resulting mixture was mechanically stirred for 0.5 h to obtain a viscous mixture. Then the viscous mixture was dried at 140-160° C. for 3 h to obtain a powder mixture. Subsequently, the powder mixture was placed in a mold and pre-pressed under 20-30 MPa 3 times, for 3-5 min each time. The following was the curing and forming process. Specifically, the mold was preheated to 145-155° C. at a rate of 90-110° C./h; a pressure of 30-40 MPa was applied on the mold; and the temperature was kept at 145-155° C. for 1-2 h. The temperature of the mold was raised to 255-265° C. at a rate of 40-60° C./h; the pressure applied on the mold was increased to 60-80 MPa; and the temperature was kept at 255-265° C. for 1 h. The temperature of the mold was raised to 370-380° C. at a rate of 40-60° C./h, and when a temperature controller indicated that the temperature reached the desired temperature, the pressure applied on the mold was increased to 100-120 MPa; and the temperature at 370-380° C. and the pressure at 100-120 MPa were kept for 3-4 h, during which gas was discharged 2-3 times. After curing, the temperature of the mold was lowered to 255-265° C. at a rate of 40-60° C./h; the pressure of the mold was reduced to 60-80 MPa; and the temperature was kept at 255-265° C. for 1-2 h. The mold was naturally cooled at a rate of 90-110° C./h; and the pressure of the mold was released followed by demolding.

Example 3

22% by weight of PI powder, 8% by weight of CF powder and 70% by weight of PEEK powder were placed in a beaker. Absolute ethanol was added to the breaker to immerse the powder. The resulting mixture was mechanically stirred for 0.5 h to obtain a viscous mixture. Then the viscous mixture was dried at 140-160° C. for 3 h to obtain a powder mixture. Subsequently, the powder mixture was placed in a mold and pre-pressed under 20-30 MPa 3 times, for 3-5 min each time. The following was the curing and forming process. Specifically, the mold was preheated to 145-155° C. at a rate of 90-110° C./h; a pressure of 30-40 MPa was applied on the mold; and the temperature was kept at 145-155° C. for 1-2 h. The temperature of the mold was raised to 255-265° C. at a rate of 40-60° C./h; the pressure applied on the mold was increased to 60-80 MPa; and the temperature was kept at 255-265° C. for 1 h. The temperature of the mold was raised to 370-380° C. at a rate of 40-60° C./h, and when a temperature controller indicated that the temperature reached the desired temperature, the pressure applied on the mold was increased to 100-120 MPa; and the temperature at 370-380° C. and the pressure at 100-120 MPa were kept for 3-4 h, during which gas was discharged 2-3 times. After curing, the temperature of the mold was lowered to 255-265° C. at a rate of 40-60° C./h; the pressure of the mold was reduced to 60-80 MPa; and the temperature was kept at 255-265° C. for 1-2 h. The mold was naturally cooled at a rate of 90-110° C./h; and the pressure of the mold was released followed by demolding.

Example 4

23% by weight of PI powder, 7% by weight of CF powder and 70% by weight of PEEK powder were placed in a beaker. Absolute ethanol was added to the breaker to immerse the powder. The resulting mixture was mechanically stirred for 0.5 h to obtain a viscous mixture. Then the viscous mixture was dried at 140-160° C. for 3 h to obtain a powder mixture. Subsequently, the powder mixture was placed in a mold and pre-pressed under 20-30 MPa 3 times, for 3-5 min each time. The following was the curing and forming process. Specifically, the mold was preheated to 145-155° C. at a rate of 90-110° C./h; a pressure of 30-40 MPa was applied on the mold; and the temperature was kept at 145-155° C. for 1-2 h. The temperature of the mold was raised to 255-265° C. at a rate of 40-60° C./h; the pressure applied on the mold was increased to 60-80 MPa; and the temperature was kept at 255-265° C. for 1 h. The temperature of the mold was raised to 370-380° C. at a rate of 40-60° C./h, and when a temperature controller indicated that the temperature reached the desired temperature, the pressure applied on the mold was increased to 100-120 MPa; and the temperature at 370-380° C. and the pressure at 100-120 MPa were kept for 3-4 h, during which gas was discharged 2-3 times. After curing, the temperature of the mold was lowered to 255-265° C. at a rate of 40-60° C./h; the pressure of the mold was reduced to 60-80 MPa; and the temperature was kept at 255-265° C. for 1-2 h. The mold was naturally cooled at a rate of 90-110° C./h; and the pressure of the mold was released followed by demolding.

Example 5

24% by weight of PI powder, 6% by weight of CF powder and 70% by weight of PEEK powder were placed in a beaker. Absolute ethanol was added to the breaker to immerse the powder. The resulting mixture was mechanically stirred for 0.5 h to obtain a viscous mixture. Then the viscous mixture was dried at 140-160° C. for 3 h to obtain a powder mixture. Subsequently, the powder mixture was placed in a mold and pre-pressed under 20-30 MPa 3 times, for 3-5 min each time. The following was the curing and forming process. Specifically, the mold was preheated to 145-155° C. at a rate of 90-110° C./h; a pressure of 30-40 MPa was applied on the mold; and the temperature was kept at 145-155° C. for 1-2 h. The temperature of the mold was raised to 255-265° C. at a rate of 40-60° C./h; the pressure applied on the mold was increased to 60-80 MPa; and the temperature was kept at 255-265° C. for 1 h. The temperature of the mold was raised to 370-380° C. at a rate of 40-60° C./h, and when a temperature controller indicated that the temperature reached the desired temperature, the pressure applied on the mold was increased to 100-120 MPa; and the temperature at 370-380° C. and the pressure at 100-120 MPa were kept for 3-4 h, during which gas was discharged 2-3 times. After curing, the temperature of the mold was lowered to 255-265° C. at a rate of 40-60° C./h; the pressure of the mold was reduced to 60-80 MPa; and the temperature was kept at 255-265° C. for 1-2 h. The mold was naturally cooled at a rate of 90-110° C./h; and the pressure of the mold was released followed by demolding.

Example 6

25% by weight of PI powder, 5% by weight of CF powder and 70% by weight of PEEK powder were placed in a beaker. Absolute ethanol was added to the breaker to immerse the powder. The resulting mixture was mechanically stirred for 0.5 h to obtain a viscous mixture. Then the viscous mixture was dried at 140-160° C. for 3 h to obtain a powder mixture. Subsequently, the powder mixture was placed in a mold and pre-pressed under 20-30 MPa 3 times, for 3-5 min each time. The following was the curing and forming process. Specifically, the mold was preheated to 145-155° C. at a rate of 90-110° C./h; a pressure of 30-40 MPa was applied on the mold; and the temperature was kept at 145-155° C. for 1-2 h. The temperature of the mold was raised to 255-265° C. at a rate of 40-60° C./h; the pressure applied on the mold was increased to 60-80 MPa; and the temperature was kept at 255-265° C. for 1 h. The temperature of the mold was raised to 370-380° C. at a rate of 40-60° C./h, and when a temperature controller indicated that the temperature reached the desired temperature, the pressure applied on the mold was increased to 100-120 MPa; and the temperature at 370-380° C. and the pressure at 100-120 MPa were kept for 3-4 h, during which gas was discharged 2-3 times. After curing, the temperature of the mold was lowered to 255-265° C. at a rate of 40-60° C./h; the pressure of the mold was reduced to 60-80 MPa; and the temperature was kept at 255-265° C. for 1-2 h. The mold was naturally cooled at a rate of 90-110° C./h; and the pressure of the mold was released followed by demolding.

Comparative Example 1

20% by weight of PI powder and 80% by weight of PEEK powder were placed in a beaker. Absolute ethanol was added to the breaker to immerse the powder. The resulting mixture was mechanically stirred for 0.5 h to obtain a viscous mixture. Then the viscous mixture was dried at 140-160° C. for 3 h to obtain a powder mixture.

Subsequently, the powder mixture was placed in a mold and pre-pressed under 20-30 MPa 3 times, for 3-5 min each time. The following was the curing and forming process. Specifically, the mold was preheated to 145-155° C. at a rate of 90-110° C./h; a pressure of 30-40 MPa was applied on the mold; and the temperature was kept at 145-155° C. for 1-2 h. The temperature of the mold was raised to 255-265° C. at a rate of 40-60° C./h; the pressure applied on the mold was increased to 60-80 MPa; and the temperature was kept at 255-265° C. for 1 h. The temperature of the mold was raised to 370-380° C. at a rate of 40-60° C./h, and when a temperature controller indicated that the temperature reached the desired temperature, the pressure applied on the mold was increased to 100-120 MPa; and the temperature at 370-380° C. and the pressure at 100-120 MPa were kept for 3-4 h, during which gas was discharged 2-3 times. After curing, the temperature of the mold was lowered to 255-265° C. at a rate of 40-60° C./h; the pressure of the mold was reduced to 60-80 MPa; and the temperature was kept at 255-265° C. for 1-2 h. The mold was naturally cooled at a rate of 90-110° C./h; and the pressure of the mold was released followed by demolding.

Comparative Example 2

25% by weight of PI powder and 75% by weight of PEEK powder were placed in a beaker. Absolute ethanol was added to the breaker to immerse the powder. The resulting mixture was mechanically stirred for 0.5 h to obtain a viscous mixture. Then the viscous mixture was dried at 140-160° C. for 3 h to obtain a powder mixture. Subsequently, the powder mixture was placed in a mold and pre-pressed under 20-30 MPa 3 times, for 3-5 min each time. The following was the curing and forming process. Specifically, the mold was preheated to 145-155° C. at a rate of 90-110° C./h; a pressure of 30-40 MPa was applied on the mold; and the temperature was kept at 145-155° C. for 1-2 h. The temperature of the mold was raised to 255-265° C. at a rate of 40-60° C./h; the pressure applied on the mold was increased to 60-80 MPa; and the temperature was kept at 255-265° C. for 1 h. The temperature of the mold was raised to 370-380° C. at a rate of 40-60° C./h, and when a temperature controller indicated that the temperature reached the desired temperature, the pressure applied on the mold was increased to 100-120 MPa; and the temperature at 370-380° C. and the pressure at 100-120 MPa were kept for 3-4 h, during which gas was discharged 2-3 times. After curing, the temperature of the mold was lowered to 255-265° C. at a rate of 40-60° C./h; the pressure of the mold was reduced to 60-80 MPa; and the temperature was kept at 255-265° C. for 1-2 h. The mold was naturally cooled at a rate of 90-110° C./h; and the pressure of the mold was released followed by demolding.

Comparative Example 3

Thermoset polyimide P84 (simply called PI-3) was prepared and dried at 140-160° C. for 3 h to obtain a powder mixture. Subsequently, the powder mixture was placed in a mold and pre-pressed under 20-30 MPa 3 times, for 3-5 min each time. The following was the curing and forming process. Specifically, the mold was preheated to 145-155° C. at a rate of 90-110° C./h; a pressure of 30-40 MPa was applied on the mold; and the temperature was kept at 145-155° C. for 1-2 h. The temperature of the mold was raised to 255-265° C. at a rate of 40-60° C./h; the pressure applied on the mold was increased to 60-80 MPa; and the temperature was kept at 255-265° C. for 1 h. The temperature of the mold was raised to 370-380° C. at a rate of 40-60° C./h, and when a temperature controller indicated that the temperature reached the desired temperature, the pressure applied on the mold was increased to 100-120 MPa; and the temperature at 370-380° C. and the pressure at 100-120 MPa were kept for 3-4 h, during which gas was discharged 2-3 times. After curing, the temperature of the mold was lowered to 255-265° C. at a rate of 40-60° C./h; the pressure of the mold was reduced to 60-80 MPa; and the temperature was kept at 255-265° C. for 1-2 h. The mold was naturally cooled at a rate of 90-110° C./h; and the pressure of the mold was released followed by demolding.

Figure 2:
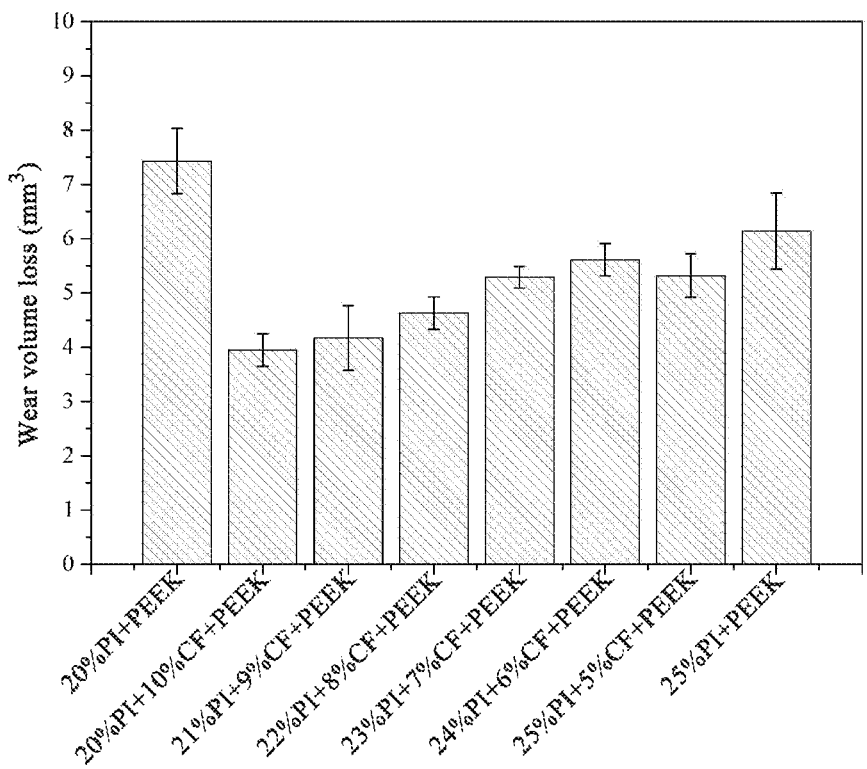
FIG. 2 a bar graph showing the wear volume loss of various materials prepared in Examples 1-6 and Comparative Examples 1 and 2 under the seawater environment.

The material samples prepared in Examples 1-6 and Comparative Examples 1-2 were compared in terms of their tribological properties. The results were shown in FIGS. 1 and 2.

The tribological test under the seawater environment was carried out on a pin-on-disk tribometer at 100 N and 0.5 m/s with a turning radius of 21 mm, so as to obtain the friction coefficient and wear volume loss of materials. Counterparts of the kinematic pair were 17-4PH stainless steel pins with a diameter of 8 mm.

Figure 3:
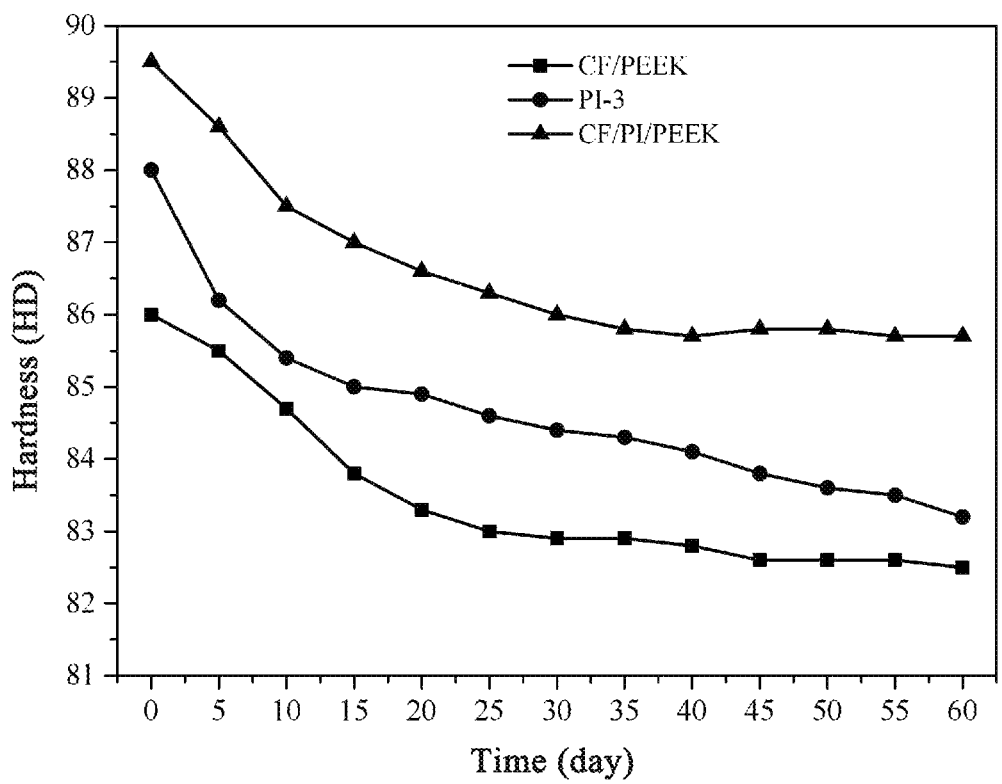
FIG. 3 shows the hardness of three materials prepared in Example 1, Comparative Examples 2 and 3 under the seawater environment as a function of immerse time.
Figure 4:
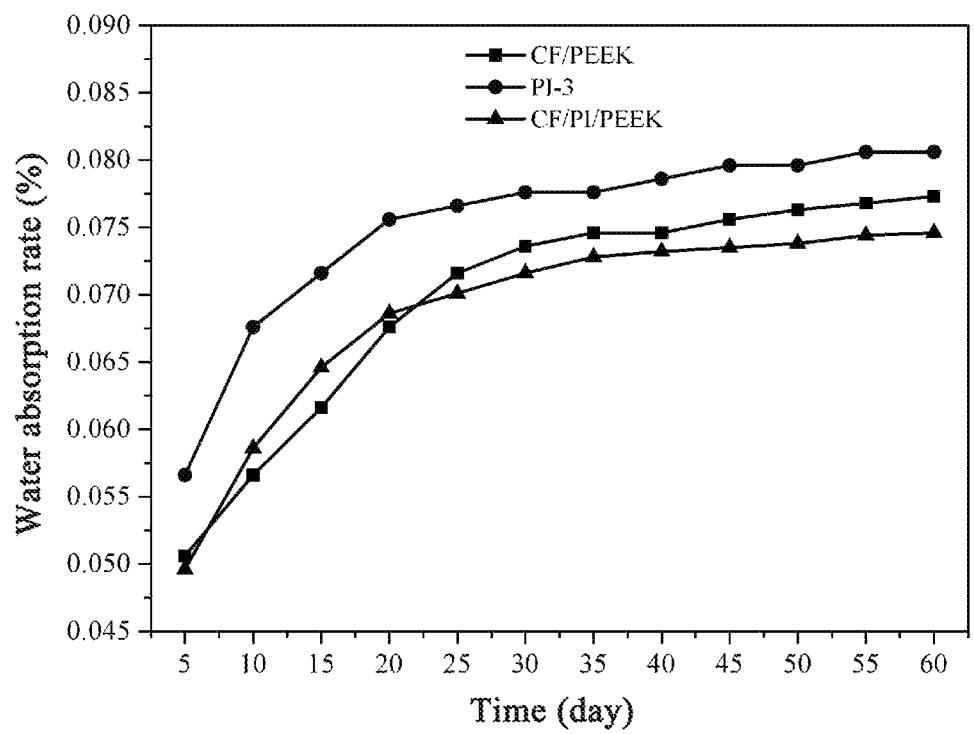
FIG. 4 shows the water absorption rate of the three materials prepared in Example 1, Comparative Examples 2 and 3 under the seawater environment as a function of immerse time.

The CF/PI/PEEK sample prepared in Example 1, the CF/PEEK sample prepared in Comparative Example 2 and the PI-3 sample prepared in Comparative Example 3 were immersed in the seawater for 5, 10, 15, 20, 25, 30, 35, 40, 45, 50, 55 and 60 days. The results on hardness and water absorption rate of these three samples versus immerse time were shown in FIG. 3 and FIG. 4.

Figure 5:
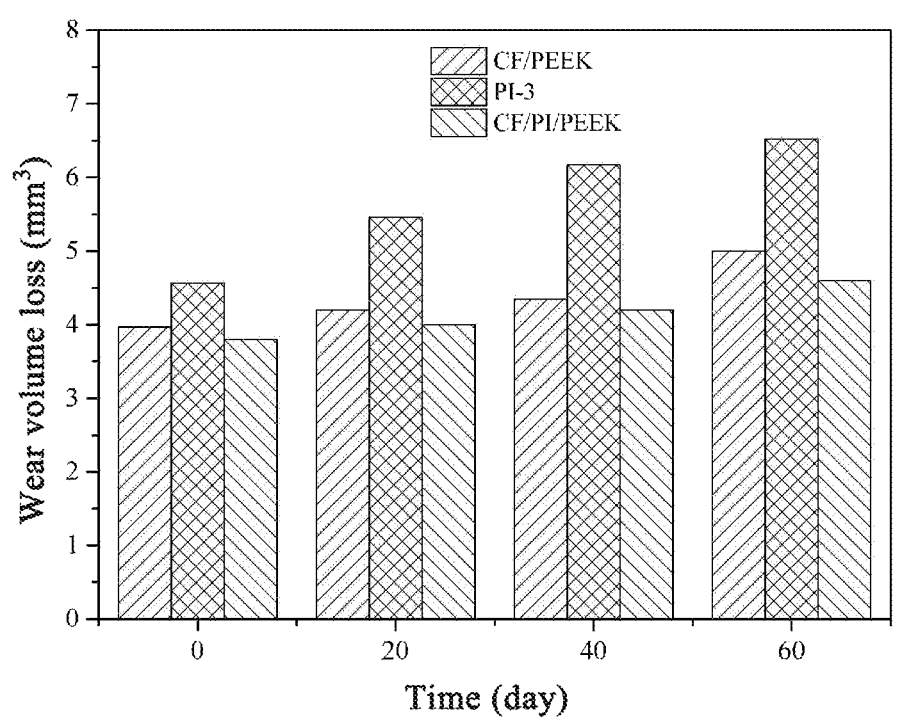
FIG. 5 is bar graph showing the wear volume loss of the three materials prepared in Example 1, Comparative Examples 2 and 3 versus immerse time under the seawater environment.

The CF/PI/PEEK sample prepared in Example 1, the CF/PEEK sample prepared in Comparative Example 2 and the PI-3 sample prepared in Comparative Example 3 were immersed in seawater for 0, 20, 40 and 60 days. The tribological tests at 50 N and 0.5 m/s were carried out, and the results on the wear volume loss of these three samples versus immerse time was shown in FIG. 5.

It can be seen from FIGS. 1-5 that the CF/PI/PEEK samples of Examples 1-6 had a lower friction coefficient and smaller wear volume loss than the PI/PEEK sample prepared in Comparative Example 2, where the CF/PI/PEEK sample of Example 1 had the lowest friction coefficient and smallest wear volume loss. According to results of the experiments simulating under the seawater environment, the CF/PI/PEEK composite of Example 1 had highest hardness, lowest water absorption rate and smallest wear volume loss when compared to the CF/PEEK material prepared in Comparative Example 2 and the PI-3 material prepared in Comparative Example 3, indicating that the CF/PI/PEEK composite material (prepared from 20-25% by weight of PI powder, 5-10% by weight of CF powder and 70% by weight of PEEK powder) provided herein had excellent tribological properties under the seawater environment.

What is claimed is:
1. A method for preparing a friction-reducing and anti-wear composite material, comprising:
   (1) preparing polyether ether ketone (PEEK) powder, polyimide (PI) powder and an inorganic chopped carbon fiber for use;
   (2) uniformly mixing the PEEK powder, the PI powder and the inorganic chopped carbon fiber to form a powder mixture; and
   (3) placing the powder mixture in a mold and pressing the mold by a heat press for curing to obtain a cured product;
   wherein the pressing the mold in step (3) comprises:
   i) preheating the mold to 145-155° C. at a rate of 90-110° C./h, applying a pressure of 30-40 MPa on the mold, and keeping the temperature at 145-155° C. for 1-2 h;
   ii) raising the temperature of the mold to 255-265° C. at a rate of 40-60° C./h; increasing the pressure applied on the mold to 60-80 MPa; and keeping the temperature at 255-265° C. for 1 h; and
   iii) raising the temperature of the mold to 370-380° C. at a rate of 40-60° C./h, and when a temperature controller indicates that the temperature reaches a desired temperature, increasing the pressure applied on the mold to 100-120 MPa and keeping the temperature at 370-380° C. and the pressure at 100-120 MPa for 3-4 h, during which gas is discharged 2-3 times;
   (4) lowering the temperature of the mold to 255-265° C. at a rate of 40-60° C./h; reducing the pressure of the mold to 60-80 1 MPa; and keeping the temperature at 255-265° C. for 1-2 h; and
   (5) cooling the mold naturally at a rate of 90-110° C./h, releasing the pressure of the mold and demolding the cured product to obtain a sample of the friction-reducing and anti-wear composite material.
2. The method of claim 1, wherein the PEEK powder, the PI powder and the inorganic chopped carbon fiber are uniformly wet-mixed in a volatile solvent and then dried to obtain the powder mixture.
3. The method of claim 2, wherein step (3) further comprises: before step i), pressing the powder mixture under 20-30 MPa 2-4 times, for 3-5 min each time.

* * * * *